US012001985B2

(12) United States Patent
Hollender et al.

(10) Patent No.: US 12,001,985 B2
(45) Date of Patent: Jun. 4, 2024

(54) SYSTEM FOR ACTION DETERMINATION

(71) Applicant: ABB Schweiz AG, Baden (CH)

(72) Inventors: Martin Hollender, Dossenheim (DE); Felix Lenders, Darmstadt (DE); Josef Bicik, Prague (CZ); Mark Stefan Struempfler, Mannheim (DE); Rebekka Litzelmann, Mannheim (DE); Dominik Steickert, Griesheim (DE)

(73) Assignee: ABB Schweiz AG, Baden (CH)

( * ) Notice: Subject to any disclaimer, the term of this patent is extended or adjusted under 35 U.S.C. 154(b) by 70 days.

(21) Appl. No.: 17/507,819

(22) Filed: Oct. 22, 2021

(65) Prior Publication Data

US 2022/0044178 A1 Feb. 10, 2022

Related U.S. Application Data

(63) Continuation of application No. PCT/EP2020/061008, filed on Apr. 20, 2020.

(30) Foreign Application Priority Data

Apr. 25, 2019 (EP) .................................... 19171067

(51) Int. Cl.
*G06Q 10/00* (2023.01)
*G06Q 10/0631* (2023.01)

(52) U.S. Cl.
CPC .............................. *G06Q 10/06316* (2013.01)

(58) Field of Classification Search
CPC ............................................... G06Q 10/06316
See application file for complete search history.

(56) References Cited

U.S. PATENT DOCUMENTS 8,638,212 B2 1/2014 Borchers et al.
2007/0194920 A1 8/2007 Hollifield
(Continued)

FOREIGN PATENT DOCUMENTS

EP 3187950 A1 7/2017
JP 2015-148867 A 8/2015
WO WO 2019038283 A1 2/2019

OTHER PUBLICATIONS

G. Dorgo and J. Abonyi, "Sequence Mining Based Alarm Suppression," in IEEE Access, vol. 6, pp. 15365-15379, 2018, doi: 10.1109/ACCESS.2018.2797247. (Year: 2018).*

(Continued)

*Primary Examiner* — Matheus Ribeiro Stivaletti

(74) *Attorney, Agent, or Firm* — Leydig, Voit & Mayer, Ltd.

(57) ABSTRACT

A system for action determination includes an input unit, a processing unit, and an output unit. The input unit provides the processing unit with information relating to a plurality of past actions over a period of time associated with the operation of an industrial process. The input unit provides the processing unit with information relating to a plurality of past process events over the time period associated with the operation of the industrial process. The input unit provides the processing unit with information relating to a new process event. The processing unit determines a correlation between at least some of the plurality of past actions with at least some of the past process events. The processing unit determines at least one recommended action from the information relating to the new process event, the determination including utilization of the determined correlation. The output unit outputs the at least one recommended action.

13 Claims, 1 Drawing Sheet

(56) References Cited

U.S. PATENT DOCUMENTS

| | | |
|---|---|---|
| 2010/0211192 A1 | 8/2010 | Stluka et al. |
| 2010/0289638 A1* | 11/2010 | Borchers ............ G05B 23/0272 |
| | | 340/506 |
| 2011/0320388 A1 | 12/2011 | Wong et al. |
| 2015/0220847 A1 | 8/2015 | Shibuya et al. |
| 2017/0076209 A1 | 3/2017 | Sisk et al. |
| 2018/0322770 A1* | 11/2018 | Srinivasan ......... G05B 23/0272 |
| 2019/0041845 A1 | 2/2019 | Cella et al. |
| 2019/0294158 A1* | 9/2019 | Hokeness ............ G05B 23/027 |
| 2021/0141939 A1* | 5/2021 | Slavin ................... H04L 9/0643 |

OTHER PUBLICATIONS

Emerson Deltav Distributed Control System, "Alarm Help," pp. 1-21, Dec. 2017, Emerson Electric, St. Louis, MO, USA.
Japan Patent Office, Office Action in Japanese Patent Application No. 2021-563099, 8 pp. (dated Jun. 12, 2023).

* cited by examiner

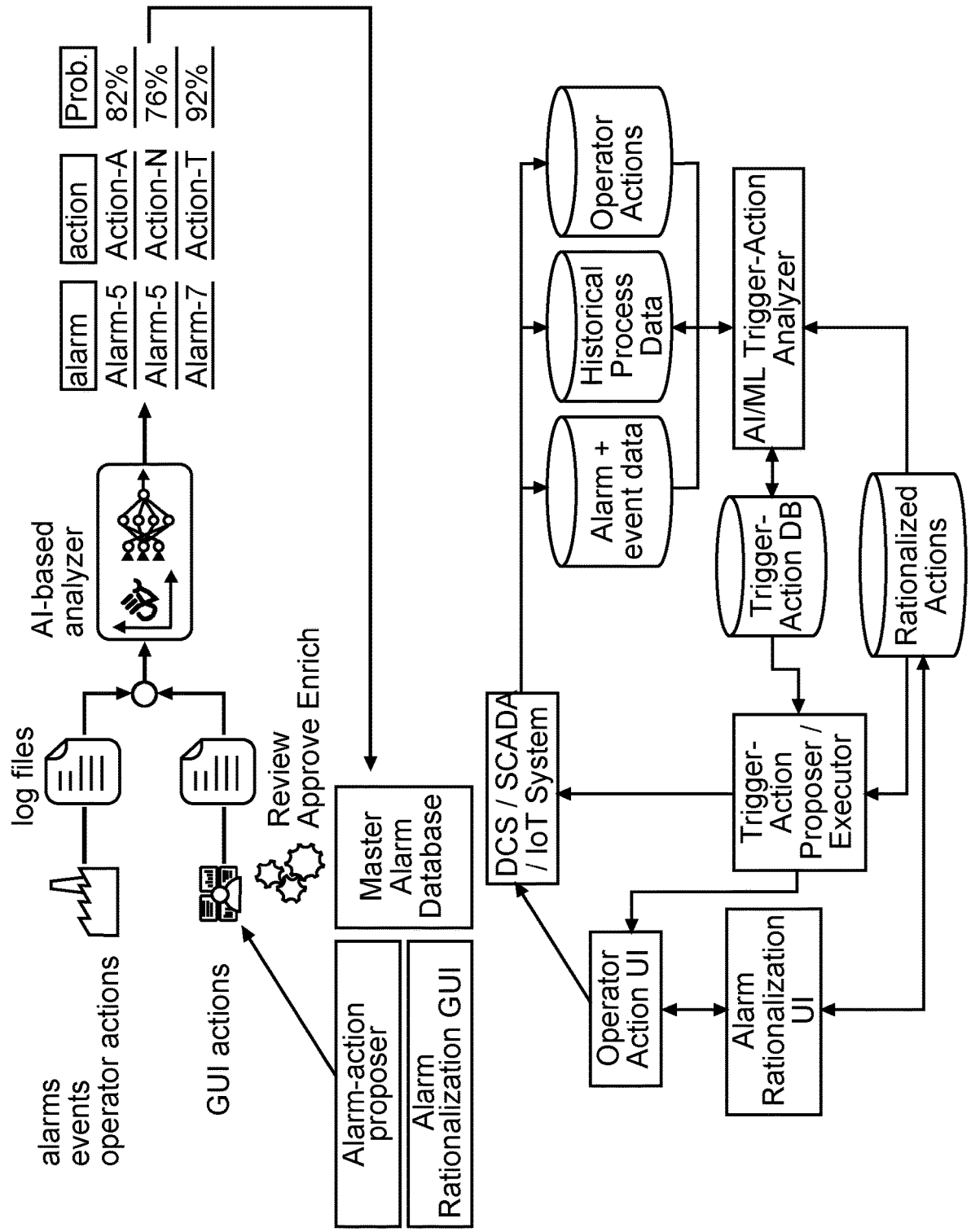

SYSTEM FOR ACTION DETERMINATION

CROSS-REFERENCE TO PRIOR APPLICATIONS

This application is a continuation of International Patent Application No. PCT/EP2020/061008, filed on Apr. 20, 2020, which claims priority to European Patent Application No. EP 19171067.2, filed on Apr. 25, 2019. The entire disclosure of both applications is hereby incorporated by reference herein.

FIELD

One or more embodiments of the present invention relates to a system for action determination, and to a method for action determination, and to a computer program element and computer readable medium.

BACKGROUND

A process plant can have many process control systems, for example those used in chemical, petroleum and other industrial processes. One or more process controllers are communicatively coupled to various field devices such as valves, valve positioners, relays, switches, various sensors that monitor temperature, pressure, position, flow rates etc. The process controllers receive data signals indicative of process measurements made by the field devices, which can be used to generate control signals to implement control routines.

Users or operators in control rooms have access to information from the field devices and process controllers, and running appropriate software on computer systems are able to perform a variety of tasks, such as viewing the current state of the process, changing an operating state, changing settings of a process control routine, modifying the operation of the process controllers and/or the field devices.

Furthermore, such process plants have numerous alarm systems that monitor the field devices and process controllers. Alarm data is also provided to the users and operators, and this forms an important aid identifying installation or process states that require immediate action. Since both individual components and subsystems of a control system are designed to generate alarms. Thus tens of thousands of data signals and alarm data can occur. However, if too many alarms are generated during serious situations, the user/operator may possibly be confused if they are inexperienced, and alarms which are actually important may remain unidentified or ignored in the flood of alarms or, an operator can take the wrong decision/action or make inconsistent actions. This is particularly problematic when an unusual alarm or event has just occurred or is occurring.

Historically, experienced operators have been able to deal with this situation, but even experienced operators with many years of experience have difficulties copying with the flood of alarms that can be experienced. As these experienced operators retire, the situation is exacerbated for junior or inexperienced operators.

There is a need to address this situation.

SUMMARY

In one or more embodiments, the present invention may provide a system for action determination. The system may comprise: an input unit; a processing unit; and an output unit, wherein the input unit provides the processing unit with information relating to a plurality of past actions over a period of time associated with an operation of an industrial process, wherein the input unit provides the processing unit with information relating to a plurality of past process events over the time period associated with the operation of the industrial process, wherein the input unit provides the processing unit with information relating to a new process event, wherein the processing unit determines a correlation between at least some of the plurality of past actions with at least some of the past process events, wherein the processing unit determines at least one recommended action from the information relating to the new process event, the determination comprising utilization of the determined correlation, and wherein the output unit outputs the at least one recommended action.

Therefore, it would be advantageous to have an improved ability to determine actions to be taken within such a process environment.

An object of one or more embodiments of the present invention may be solved with the subject matter of the independent claims, wherein further embodiments are incorporated in the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows an example of a system and method for action determination within a process environment.

DETAILED DESCRIPTION

In a first aspect, there is provided a system for action determination, comprising:
an input unit;
a processing unit; and
an output unit.

The input unit is configured to provide the processing unit with information relating to a plurality of past actions over a period of time associated with the operation of an industrial process. The input unit is configured to provide the processing unit with information relating to a plurality of past process events over the time period associated with the operation of the industrial process. The input unit is configured to provide the processing unit with information relating to a new process event. The processing unit is configured to determine a correlation between at least some of the plurality of past actions with at least some of the past process events. The processing unit is configured to determine at least one recommended action from the information relating to the new process event, the determination comprising utilization of the determined correlation. The output unit is configured to output the at least one recommended action.

In the above, an action, whether a past action or a recommended action, is anything that can be logged. Thus, an action can be from an industrial processing system. An action can also be calling a specific telephone number. An action can be opening a specific application (for example: CMMS, emission monitoring, vibration monitoring etc). An action can be opening a specific document (for example a pdf/html/Word document etc) on a specific page. An action can be messaging a specific person or a user group. An action can also be an "action group", in terms of being more than one action, and can for example be a sequence of multiple actions. Also, a past action can relate to an inspection activity associated with an industrial process.

In the above, the output unit can be part of the distributed control system (DCS) itself, where for example the output unit can be enabled to directly execute routine actions (for example the closing and/or opening of a valve). The output unit can be an operator's console, where specific views (for example relevant alarm lists, trend views, process graphics) are opened to help the operator assess the situation and take further actions. The output unit can relate to an action outside of the DCS (for example used to call a colleague, create a work order, email colleague, call emergency services etc).

In other words, a system is provided for determining actions based on past actions and events, such as alarms for an industrial process plant, that enables an appropriate action to be determined, when for example an unusual alarm or event arises and enables a best course of action to remedy the situation to be determined.

Process plants can have many thousands of time varying data signals, with many alarms and events occurring, often coming in floods of events. However, only a few of these signals, alarms and events are relevant to a specific problem in the plant.

Operators, with years of experience can deal with this massive influx of information to determine the appropriate action in these situations, however as these people retire it is becoming ever harder for operators, especially junior operators, to take the correct action. Also, taking incorrect actions in situations with high risk is expensive. Sometimes, such junior operators act inconsistently, and take the wrong course of action. Thus, the developed system takes into account the influx of past events, such as alarms and signals, and takes into account how experienced operators have acted and processes all of the information to enable an appropriate action to be determined on the basis of a new process event, that none of the operators now present have ever witnessed before. But also, relatively mundane actions that the operator is almost certain are correct, are confirmed by the system providing a "second pair of eyes" in situations when the operator knows what to do, but has that action confirmed. Thus, new operators can act more confidently and become more effective more quickly.

In an example, the information relating to the plurality of past process actions comprises one or more operator actions.

In an example, the information relating to the plurality of process actions comprises one or more actions on a GUI level.

In an example, the information relating to the plurality of process events comprises one or more alarms.

In an example, the information relating to the plurality of process events comprises one or more system states.

In an example, the one or more system states comprises one or more current system states and/or one or more predicted system states.

In an example, the new process event is an alarm.

In an example, the one or more alarms comprises a plurality of alarms and wherein the processing unit is configured to determine the at least some of the past process events, the determination comprising ignoring one or more alarms that appear multiple times.

In an example, the one or more alarms comprises a plurality of alarms and wherein the processing unit is configured to determine the at least some of the past process events, the determination comprising ignoring one or more alarms that appear uniformly over the time period.

In an example, the one or more alarms comprises a plurality of alarms and wherein the processing unit is configured to determine the at least some of the past process events. The determination comprises clustering multiple identical alarms within a defined short time interval relative to the period of time into a single alarm.

In an example, the one or more alarms comprises a plurality of alarms and wherein determination of the correlation comprises a statistical analysis to detect a relationship between alarms and actions.

In an example, the one or more alarms comprises a plurality of alarms and wherein determination of the correlation comprises a selection of alarms that occur rarely during the time period.

In an example, the one or more alarms comprises a plurality of alarms and wherein determination of the correlation comprises determination of an action to alarm matrix.

In an example, determination of the correlation comprises a statistical inversion of the action to alarm matrix to determine a plurality of rules and associated probabilities. Determination of the at least one recommended action then comprises utilization of the plurality of rules and associated probabilities.

In an example, the processing unit is configured to remove one or more rules that correspond to an alarm that triggers a significantly high number of rules. Determination of the at least one recommended action then comprises utilization of the plurality of rules and associated probabilities that remain after removal of the one or more rules.

In an example, the processing unit is configured to apply a principal component analysis to filter most significant rules. Determination of the at least one recommended action then comprises utilization of the most significant rules.

In an example, determination of the correlation comprises a utilization of natural language processing and word embeddings to obtain vectorial representations of information relating to the plurality of past actions and the information relating to the plurality of past process events. Actions and events are determined to be correlated when related actions and events are mapped close together in feature space with respect to other mappings.

In an example, determination of the correlation comprises utilization of a neural network.

In a second aspect, there is provided a method for action determination, comprising:
  a) providing a processing unit with information relating to a plurality of past actions over a period of time associated with the operation of an industrial process;
  b) providing the processing unit with information relating to a plurality of past process events over the time period associated with the operation of the industrial process;
  c) providing the processing unit with information relating to a new process event;
  d) determining by the processing unit a correlation between at least some of the plurality of past actions provided at step a) with at least some of the past process events provided at step b);
  e) determining by the processing unit at least one recommended action from the information relating to the new process event provided at step c), the determination comprising utilization of the correlation determined at step d); and
  f) outputting by an output unit the at least one recommended action.

According to another aspect, there is provided a computer program element controlling apparatus or system as previously described which, when the computer program element is executed by a processing unit, is adapted to perform the method steps as previously described.

According to another aspect, there is also provided a computer readable medium having stored the computer element as previously described.

The above aspects and examples will become apparent from and be elucidated with reference to the embodiments described hereinafter.

The present disclosure relates to a system and method for action determination. In an example, the system comprises an input unit, a processing unit, and an output unit. The input unit is configured to provide the processing unit with information relating to a plurality of past actions over a period of time associated with the operation of an industrial process. The input unit is configured also to provide the processing unit with information relating to a plurality of past process events over the time period associated with the operation of the industrial process. The input unit is configured also to provide the processing unit with information relating to a new process event. The processing unit is configured to determine a correlation between at least some of the plurality of past actions with at least some of the past process events. The processing unit is configured also to determine at least one recommended action from the information relating to the new process event, the determination comprising utilization of the determined correlation. The output unit is configured to output the recommended action.

Thus, the output unit can in outputting one or more recommended actions operate automatically, and enable an action such as a valve being opened or closed to occur without human intervention. Or the output unit can output an action that recommends sending a technician to inspect a specific equipment based on a past record in a work management system. Or the output unit can output an action that recommends calling or alerting someone.

In an example, the processing unit is configured to implement a machine learning algorithm to determine the correlation between at least some of the plurality of past actions with at least some of the past process events According to an example, the information relating to the plurality of past process actions comprises one or more operator actions.

According to an example, the information relating to the plurality of process actions comprises one or more actions on a GUI level.

In an example, an action at a GUI level comprises opening a trend.

In an example, an action at a GUI level comprises opening a faceplate.

In an example, an action at a GUI level comprises changing a set-point.

In an example, an action at a GUI level comprises an action that is different to a core control action.

According to an example, the information relating to the plurality of process events comprises one or more alarms.

According to an example, the information relating to the plurality of process events comprises one or more system states.

According to an example, the one or more system states comprises one or more current system states and/or one or more predicted system states.

According to an example, the new process event is an alarm.

According to an example, the one or more alarms comprises a plurality of alarms. The processing unit is configured to determine the at least some of the past process events, the determination comprising ignoring one or more alarms that appear multiple times.

According to an example, the one or more alarms comprises a plurality of alarms. The processing unit is configured to determine the at least some of the past process events, the determination comprising ignoring one or more alarms that appear uniformly over the time period.

According to an example, the one or more alarms comprises a plurality of alarms. The processing unit is configured to determine the at least some of the past process events, the determination comprising clustering multiple identical alarms within a defined short time interval relative to the period of time into a single alarm.

According to an example, the one or more alarms comprises a plurality of alarms and determination of the correlation comprises a statistical analysis to detect a relationship between alarms and actions.

According to an example, the one or more alarms comprises a plurality of alarms and determination of the correlation comprises a selection of alarms that occur rarely during the time period.

According to an example, the one or more alarms comprises a plurality of alarms and determination of the correlation comprises determination of an action to alarm matrix.

According to an example, determination of the correlation comprises a statistical inversion of the action to alarm matrix to determine a plurality of rules and associated probabilities. Determination of the at least one recommended action comprises utilization of the plurality of rules and associated probabilities.

According to an example, the processing unit is configured to remove one or more rules that correspond to an alarm that triggers a significantly high number of rules. Determination of the at least one recommended action comprises utilization of the plurality of rules and associated probabilities that remain after removal of the one or more rules.

According to an example, the processing unit is configured to apply a principal component analysis to filter most significant rules, and determination of the at least one recommended action comprises utilization of the most significant rules.

According to an example, determination of the correlation comprises a utilization of natural language processing and word embeddings to obtain vectorial representations of information relating to the plurality of past actions and the information relating to the plurality of past process events. Actions and events are determined to be correlated when related actions and events are mapped close together in feature space with respect to other mappings.

According to an example, determination of the correlation comprises utilization of a neural network.

Thus, associated with the system is a method for action determination, comprising:
 a) providing a processing unit with information relating to a plurality of past actions over a period of time associated with the operation of an industrial process;
 b) providing the processing unit with information relating to a plurality of past process events over the time period associated with the operation of the industrial process;
 c) providing the processing unit with information relating to a new process event;

d) determining by the processing unit a correlation between at least some of the plurality of past actions provided at step a) with at least some of the past process events provided at step b);

e) determining by the processing unit at least one recommended action from the information relating to the new process event provided at step c), the determination comprising utilization of the correlation determined at step d); and f) outputting by an output unit the at least one recommended action.

In an example, in step a) the information relating to the plurality of past process actions comprises one or more operator actions.

In an example, in step a) the information relating to the plurality of process actions comprises one or more actions on a GUI level.

In an example, an action at a GUI level comprises opening a trend.

In an example, an action at a GUI level comprises opening a faceplate.

In an example, an action at a GUI level comprises changing a set-point.

In an example, an action at a GUI level comprises an action that is different to a core control action.

In an example, in step b) the information relating to the plurality of process events comprises one or more alarms.

In an example, in step b) the information relating to the plurality of process events comprises one or more system states.

In an example the one or more system states comprises one or more current system states and/or one or more predicted system states.

In an example, in step c) the information relating to a new process event relates to a process event that is an alarm.

In an example, in step b) the plurality of past process events comprises a plurality of alarms and wherein in step d) the processing unit determines the at least some of the past process events, the determination comprising ignoring one or more alarms that appear multiple times.

In an example, in step b) the plurality of past process events comprises a plurality of alarms and wherein in step d) the processing unit determines the at least some of the past process events, the determination comprising ignoring one or more alarms that appear uniformly over the time period.

In an example, in step b) the plurality of past process events comprises a plurality of alarms and wherein in step d) the processing unit determines the at least some of the past process events, the determination comprising clustering multiple identical alarms within a defined short time interval relative to the period of time into a single alarm.

In an example, in step b) the plurality of past process events comprises a plurality of alarms and wherein step d) comprises a statistical analysis to detect a relationship between alarms and actions.

In an example, in step b) the plurality of past process events comprises a plurality of alarms and wherein step d) selecting alarms that occur rarely during the time period.

In an example, in step b) the plurality of past process events comprises a plurality of alarms and wherein step d) determining an action to alarm matrix.

In an example, step d) comprises determining a statistical inversion of the action to alarm matrix to determine a plurality of rules and associated probabilities, and wherein step e) comprises utilizing the plurality of rules and associated probabilities.

In an example, step d) comprises removing one or more rules that correspond to an alarm that triggers a significantly high number of rules, and wherein step e) comprises utilizing the plurality of rules and associated probabilities that remain after removal of the one or more rules.

In an example, step d) comprises applying a principal component analysis to filter most significant rules, and wherein step e) comprises utilizing the most significant rules.

In an example, step d) comprises utilizing natural language processing and word embeddings to obtain vectorial representations of information relating to the plurality of past actions and the information relating to the plurality of past process events, and wherein actions and events are determined to be correlated when related actions and events are mapped close together in feature space with respect to other mappings.

In an example, step d) comprises utilizing a machine learning algorithm, such as a neural network or decision tree algorithm.

Thus, in the new system and method for action determination operator actions are captured and correlated with process events (e.g., alarms, current system state or predicted system state). Actions on GUI level are also captured (opening a trend, opening a faceplate), thus the correlated actions are not only core control actions. Then recommendation of actions can be made, when similar process event occurs again. In this way a foundation is built for future fully autonomous process control (i.e., an Artificial Intelligence based system that can learn from operators how to respond to abnormal conditions and prevent them).

To put another way, operator actions on events (e.g., alarms) are captured for training purposes, providing for a continuous and affordable solution for alarm rationalization. This also enables operator efficiency to be increased by allowing to "replay" past actions, and build up a knowledge base for AI-based operation. In this manner, the system gradually keeps improving with respect to the suggestions (recommended actions). This can be augmented through for example manual feedback, for example through rationalization of past process events and past actions, facilitated by the captured historical actions and events.

Thus, previous problems have been that plant operators receive too many alarms, and where important alarms might be ignored. Know-How of experienced operators becomes lost, and there may be insufficient training for junior operators, and no best practices for how to react to specific alarms. Reactions to alarms are time consuming and inconsistent, and rationalization is very expensive, and often alarms have never been rationalized. That means that most of the alarm occurrences are meaningless. In addition, important alarms might have been overlooked, i.e. no action is performed, although it would have been required. These are additional obstacles for an analysis, because many statistical approaches will not work under such conditions.

The system and method for action determination described here addresses these issues.

The system and method for action determination, in a very detailed embodiment as exemplified by FIG. 1, includes the following:

Data Logging: Record both alarms and operator actions;
Preprocessing: Remove insignificant frequent items;
Rule Detection Algorithm: Learn relationship between alarms and actions;
Post-processing: Remove rules that occur by coincidence;
Action suggestion and Rationalization: Interface to accept/modify/reject detected rules Data Logging In addition to alarm logging record all operator actions like open face plate, open trend, change set-point etc with all significant parameters are recorded, so that actions would be reproducible from logged data. A format is used for storing, that can easily be reused for redoing the action (e.g. open a trend automatically whenever the alarm occurs).

Preprocessing

Insignificant and very frequent alarms are removed by ignoring alarms that appear uniformly with high frequency;

Multiple identical alarms, within defined short time frames, are clustered into one alarm.

Rule Detection

Statistical Analysis is used to detect the relationship between alarms and actions. A focus is taken on rare and very rare alarms (e.g. occur less than once a week/month/year);

An Action to Alarm Matrix is set up: For every action taken and every alarm, it is computed how often that alarm occurred in a defined time-span before the action. The Action to Alarm Matrix is statistically inverted to find possible rule candidates and probabilities.

Beyond Statistical Analysis:

Natural Language Processing and Word Embeddings is used to obtain vectorial representations of alarms and events in such a way that related alarms/events are mapped to close points in feature space. In this way know-how can be transferred between identical sections/equipment (.e.g. several identical coal mills). Also the relation between closely related sensors, like redundant sensors, can be taken into account (current approaches treat each alarm separately as soon as the name is different);

A prediction model such as neuronal network is taught for alarm/action relationship based on the word embeddings.

Post-Processing

Principal Component Analysis is applied (Low rank approximation via singular value decomposition) to the Action to Alarm Matrix to filter most significant rules;

Rules are removed that occur by coincidence: Rules are removed that correspond to an alarm that triggers many rules and these examples for these rules are correlated by time in historical data.

Action Suggestion and Rationalization

Whenever an alarm occurs, actions are suggested to the operator corresponding to detected rules, ordered by probability.

Operators and/or experts are given the possibility to rationalize a detected rule. This is provided because some of the rules might be wrong (e.g. based on the actions of a junior operator who repeatedly made the same mistake);

Abnormal Situations (hopefully) don't happen every day. Therefore log files are needed for long periods>>1 year to catch enough interesting abnormal situations. (Many industrial alarm log systems delete alarms after a certain period, often less than a year);

Nuisance alarms (alarms with a high frequency) could destroy the analysis, and the system and method deals with this.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment of the present invention, a computer readable medium, such as a CD-ROM, is presented wherein the computer readable medium has a computer program element stored on it which computer program element is described by the preceding section.

While one or more embodiments of the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for action determination, comprising:
an input unit;
a processor; and
an output unit,
wherein the input unit is configured to provide the processor with information relating to a plurality of past actions over a period of time associated with an operation of an industrial process, wherein the information relating to the plurality of past actions comprises one or more operator actions,
wherein the input unit is configured to provide the processor with information relating to a plurality of past process events over the time period associated with the operation of the industrial process, wherein the information relating to the plurality of past process events comprises a plurality of alarms, wherein the processor is configured to ignore one or more alarms that appear uniformly over the time period, and wherein the processor is configured to cluster multiple identical alarms within a defined short time interval relative to the period of time into a single alarm, wherein the input unit is configured to provide the processor with information relating to a new process event, wherein the processor is configured to determine a correlation between the plurality of past actions with the past process events, wherein determination of the correlation comprises a statistical analysis to detect a relationship between alarms and actions, wherein determination of the correlation comprises determination of an action to alarm matrix, and wherein determination of the correlation comprises a statistical inversion of the action to alarm matrix to determine a plurality of rules and associated probabilities, wherein the processor is configured to apply a principal component analysis to filter most significant rules, and wherein filtering of the most significant rules comprises removal of one or more rules that correspond to an alarm that triggers a significantly high number of rules, wherein the processor is configured to determine at least one recommended action from the information relating to the new process event, the determination is based on utilization of the determined correlation and the most significant rules ordered by their associated probabilities, wherein the output unit is configured to output the at least one recommended actions, wherein the processor is configured to perform automated operation of the industrial process based on the at least one recommended action, and wherein performing the automated operation of the industrial process based on the at least one recommended action comprises closing and/or opening of a valve.

2. The system according to claim 1, wherein the information relating to the plurality of past actions comprises one or more actions on a GUI level.

3. The system according to claim 1, wherein the information relating to the plurality of past process events comprises one or more system states.

4. The system according to claim 3, wherein the one or more system states comprises one or more current system states and/or one or more predicted system states.

5. The system according to claim 1, wherein the new process event is an alarm.

6. The system according to claim 1, wherein the processor is configured to determine at least some of the plurality of past process events, the determination comprising ignoring one or more alarms that appear multiple times.

7. The system according to claim 1, wherein determination of the correlation is based on a selection of alarms that occur rarely during the time period.

8. The system according to claim 1, wherein determination of the at least one recommended action comprises utilization of the plurality of rules and associated probabilities that remain after removal of the one or more rules.

9. The system according to claim 1, wherein determination of the at least one recommended action comprises utilization of the most significant rules.

10. The system according to claim 1, wherein determination of the correlation is based on a utilization of natural language processing and word embeddings to obtain vectorial representations of information relating to the plurality of past actions and the information relating to the plurality of past process events, and wherein actions and events are determined to be correlated when related actions and events are mapped close together in feature space with respect to other mappings.

11. The system according to claim 1, wherein determination of the correlation is based on utilization of a neural network.

12. A method for action determination, comprising:
   a) providing a processor with information relating to a plurality of past actions over a period of time associated with an operation of an industrial process, wherein the information relating to the plurality of past process actions comprises one or more operator actions;
   b) providing the processor with information relating to a plurality of past process events over the time period associated with the operation of the industrial process, wherein the information relating to the plurality of past process events comprises a plurality of alarms, wherein the processor is configured to ignore one or more alarms that appear uniformly over the time period, and wherein the processor is configured to cluster multiple identical alarms within a defined short time interval relative to the period of time into a single alarm;
   c) providing the processor with information relating to a new process event;
   d) determining by the processor a correlation between at least some of the plurality of past actions provided at step a) with at least some of the past process events provided at step b), wherein determination of the correlation comprises a statistical analysis to detect a relationship between alarms and actions, wherein determination of the correlation comprises a selection of alarms that occur rarely during the time period, wherein determination of the correlation comprises determination of an action to alarm matrix, wherein determination of the correlation comprises a statistical inversion of the action to alarm matrix to determine a plurality of rules and associated probabilities, and wherein step d) comprises applying a principal component analysis to filter most significant rules and wherein filtering of the most significant rules comprises removal of one or more rules that correspond to an alarm that triggers a significantly high number of rules;
   e) determining by the processor at least one recommended action from the information relating to the new process event provided at step c), the determination comprising utilization of the correlation determined at step d), and wherein step e) comprises utilizing the most significant rules ordered by their associated probabilities;
   f) outputting, by an output unit, the at least one recommended action; and
   g) performing automated operation of the industrial process based on the at least one recommended action, wherein performing the automated operation of the industrial process based on the at least one recommended action comprises closing and/or opening of a valve.

13. A non-transitory computer-readable medium having processor-executable instructions stored thereon, wherein the processor-executable instructions, when executed by a processor, facilitate:
   a) providing the processor with the information relating to the plurality of past actions over the period of time associated with the operation of the industrial process, wherein the information relating to the plurality of past process actions comprises one or more operator actions;
b) providing the processor with the information relating to the plurality of past process events over the time period associated with the operation of the industrial process, wherein the processor is configured to ignore one or more alarms that appear uniformly over the time period, and wherein the processor is configured to cluster multiple identical alarms within a defined short time interval relative to the period of time into a single alarm;
c) providing the processor with the information relating to the new process event;
d) determining by the processor the correlation between the at least some of the plurality of the past actions provided at step a) with at least some of the past process events provided at step b), wherein determination of the correlation comprises a statistical analysis to detect a relationship between alarms and actions, wherein determination of the correlation comprises a utilization of natural language processing and word embeddings to obtain vectorial representations of information relating to the plurality of past actions and the information relating to the plurality of past process events, and wherein actions and events are determined to be correlated when related actions and events are mapped close together in feature space with respect to other mappings, wherein determination of the correlation comprises determination of an action to alarm matrix, wherein determination of the correlation comprises a statistical inversion of the action to alarm matrix to determine a plurality of rules and associated probabilities, and wherein step d) comprises applying a principal component analysis to filter most significant rules and wherein filtering of the most significant rules comprises removal of one or more rules that correspond to an alarm that triggers a significantly high number of rules;
e) determining by the processor the at least one recommended action from the information relating to the new process event provided at step c), the determination comprising utilization of the correlation determined at step d), and wherein step e) comprises utilizing the most significant rules ordered by their associated probabilities;
f) outputting by the output unit the at least one recommended action; and
g) performing automated operation of the industrial process based on the at least one recommended action, wherein performing the automated operation of the industrial process based on the at least one recommended action comprises closing and/or opening of a valve.

* * * * *